(12) United States Patent
Igari

(10) Patent No.: US 12,090,981 B2
(45) Date of Patent: Sep. 17, 2024

(54) CONTROLLER AND CONTROL METHOD

(71) Applicant: Robert Bosch GmbH, Stuttgart (DE)

(72) Inventor: Yoshihide Igari, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/797,611

(22) PCT Filed: Feb. 3, 2021

(86) PCT No.: PCT/IB2021/050849
§ 371 (c)(1),
(2) Date: Aug. 4, 2022

(87) PCT Pub. No.: WO2021/161135
PCT Pub. Date: Aug. 19, 2021

(65) Prior Publication Data
US 2023/0060955 A1    Mar. 2, 2023

(30) Foreign Application Priority Data
Feb. 14, 2020    (JP) ................... 2020-023368

(51) Int. Cl.
*B60T 8/00*    (2006.01)
*B60T 7/22*    (2006.01)
(Continued)

(52) U.S. Cl.
CPC .............. *B60T 7/22* (2013.01); *B60T 8/1706* (2013.01); *B60T 8/17558* (2013.01);
(Continued)

(58) Field of Classification Search
None
See application file for complete search history.

(56) References Cited

U.S. PATENT DOCUMENTS

2012/0205210 A1* 8/2012 Takenouchi .......... B60T 8/1706
                                                                  701/70
2016/0090037 A1    3/2016 Tetsuka et al.
(Continued)

FOREIGN PATENT DOCUMENTS

WO    2018185577 A1    10/2018
WO    2019087579 A1    5/2019

OTHER PUBLICATIONS

International Search Report and Written Opinion for Application No. PCT/IB2021/050849 dated May 25, 2021 (10 pages).

*Primary Examiner* — Truc M Do
(74) *Attorney, Agent, or Firm* — Michael Best & Friedrich LLP

(57) ABSTRACT

The present invention obtains a controller and a control method capable of hastening identification of an object or an event to be focused by a rider of a straddle-type vehicle, the rider having perceived haptic motion.
A controller (51) for a rider-assistance system (50) mounted to a straddle-type vehicle (100) includes: a determination section that determines necessity of a warning given to the rider; and a haptic motion performing section that performs haptic motion at least once to reduce or increase acceleration/deceleration of the straddle-type vehicle (100) only for a moment. The haptic motion performing section changes a priority of each wheel (3, 4) at the time of changing a braking force to reduce or increase the acceleration/deceleration only for the moment in the haptic motion according to a focusing direction that is a direction in which the rider should focus by the warning.

20 Claims, 2 Drawing Sheets

(51) Int. Cl.
- *B60T 8/17* (2006.01)
- *B60T 8/1755* (2006.01)
- *B60T 8/26* (2006.01)
- *B60T 8/32* (2006.01)
- *B60W 50/16* (2020.01)

(52) U.S. Cl.
CPC ............ *B60T 8/261* (2013.01); *B60T 8/3225* (2013.01); *B60W 50/16* (2013.01); *B60T 2201/022* (2013.01); *B60W 2300/36* (2013.01)

(56) References Cited

U.S. PATENT DOCUMENTS

| | | | |
|---|---|---|---|
| 2017/0028971 A1* | 2/2017 | Kajiyama | B60T 8/3225 |
| 2018/0208189 A1* | 7/2018 | Ginther | B60W 50/16 |
| 2020/0239021 A1* | 7/2020 | Igarashi | B60W 40/04 |
| 2021/0166558 A1* | 6/2021 | Giraud | G08G 1/0133 |

\* cited by examiner

[FIG. 1]
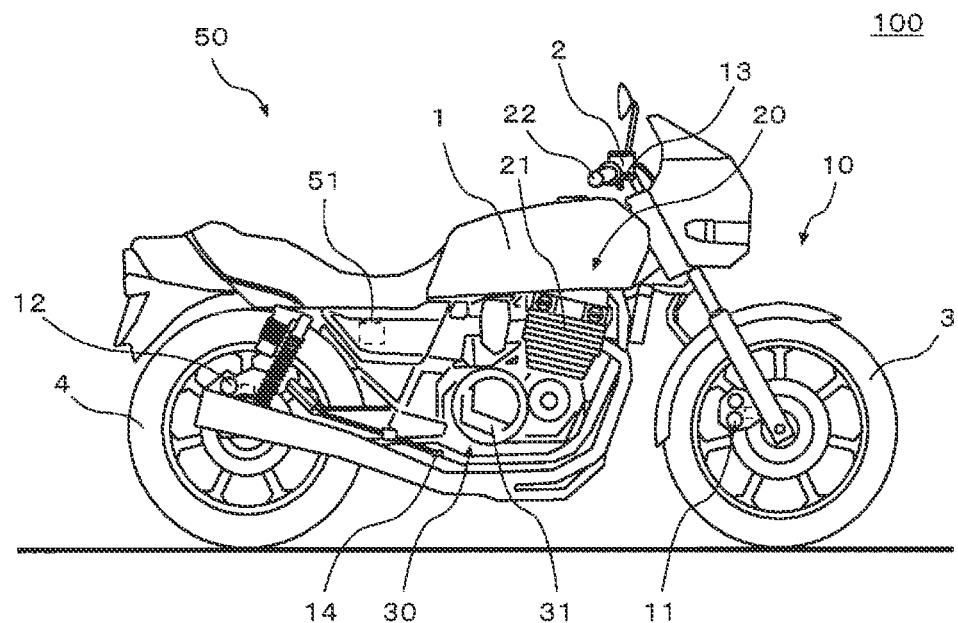
[FIG. 2]
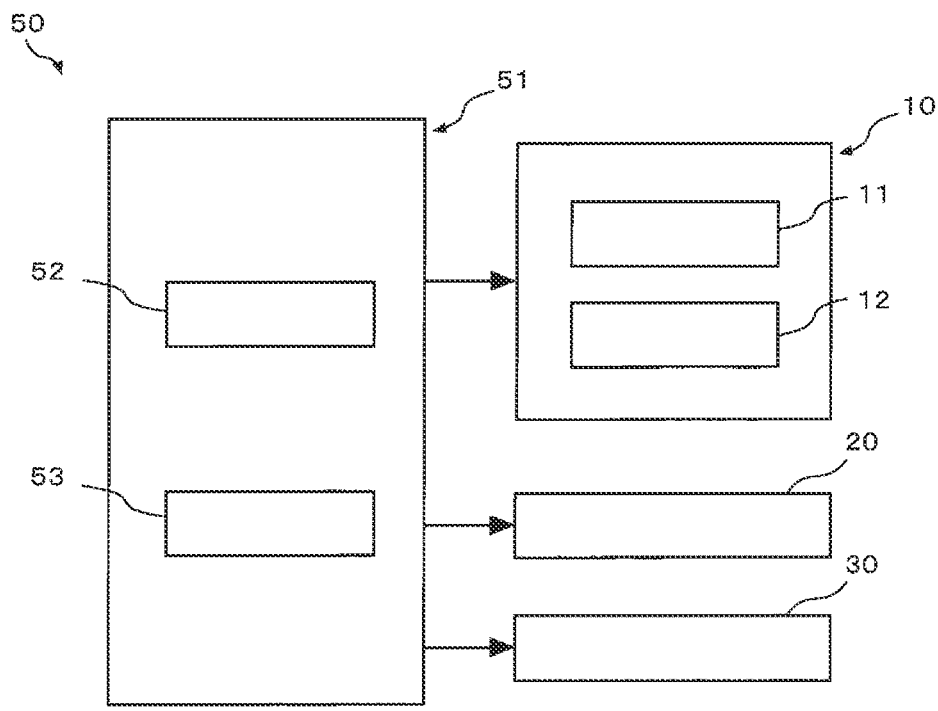

[FIG. 3]
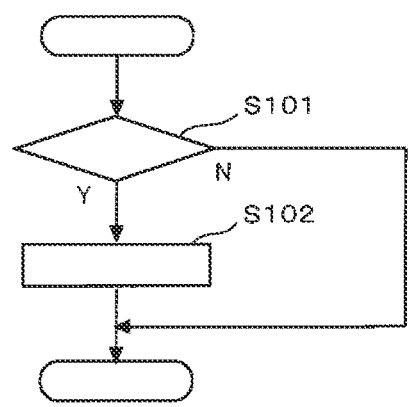

CONTROLLER AND CONTROL METHOD

BACKGROUND OF THE INVENTION

The present invention relates to a controller and a control method for a rider-assistance system that is mounted to a straddle-type vehicle.

A technique of providing a warning to a rider of a straddle-type vehicle by haptic motion has been known. During travel of the straddle-type vehicle, a controller determines necessity of the warning. When determining that the warning is necessary, the controller performs the haptic motion at least once to reduce or increase acceleration/deceleration of the straddle-type vehicle only for a moment.

The conventional controllers perform the same haptic motion regardless of a type of the warning. Thus, after perceiving occurrence of the haptic motion, the rider himself/herself has to identify an object or an event that should be focused of many objects or events. In particular, compared to other vehicles (for example, an automobile, a truck, and the like), in the straddle-type vehicle, it is further difficult to assist with such identification by using an existing device (for example, an instrument panel, a speaker, or the like). Thus, there is a tendency that the identification of the object or the event to be focused delays.

The present invention has been made in view of the above-described problem and therefore obtains a controller and a control method capable of hastening identification of an object or an event to be focused by a rider of a straddle-type vehicle, the rider having perceived haptic motion.

SUMMARY OF THE INVENTION

A controller according to the present invention is a controller for a rider-assistance system that is mounted to a straddle-type vehicle including a front wheel and a rear wheel, and includes: a determination section that determines necessity of a warning that is given to a rider of the straddle-type vehicle during travel of the straddle-type vehicle; and a haptic motion performing section that performs haptic motion at least once to reduce or increase acceleration/deceleration of the straddle-type vehicle only for a moment in the case where the determination section determines that the warning is necessary. The haptic motion performing section changes a priority of each of the wheels at the time of changing a braking force to reduce or increase the acceleration/deceleration only for the moment in the haptic motion according to a focusing direction that is a direction in which the rider should focus by the warning.

A control method according to the present invention is a control method for a rider-assistance system that is mounted to a straddle-type vehicle including a front wheel and a rear wheel, and includes: a determination step in which a determination section of a controller determines necessity of a warning that is given to a rider of the straddle-type vehicle during travel of the straddle-type vehicle; and a haptic motion performing step in which a haptic motion performing section of the controller performs haptic motion at least once to reduce or increase acceleration/deceleration of the straddle-type vehicle only for a moment in the case where it is determined in the determination step that the warning is necessary. In the haptic motion performing step, the haptic motion performing section changes a priority of each of the wheels at the time of changing a braking force to reduce or increase the acceleration/deceleration only for the moment in the haptic motion according to a focusing direction that is a direction in which the rider should focus by the warning.

In the controller and the control method according to the present invention, the haptic motion performing section changes the priority of each of the wheels at the time of changing the braking force to reduce or increase the acceleration/deceleration only for the moment in the haptic motion according to the focusing direction that is the direction in which the rider should focus by the warning. With such control, the rider who has perceived the haptic motion can roughly recognize the direction in which an object or an event to be focused is located from a difference in performance of the haptic motion. Therefore, it is possible to hasten identification of the object or the event to be focused by the rider. In particular, in the straddle-type vehicle, due to a riding posture of the rider, the difference in the performance of the haptic motion, which is caused by the change in the priority, can further be recognized easily. Therefore, it is possible to reliably hasten the identification of the object or the event to be focused by the rider.

BRIEF DESCRIPTION OF THE DRAWINGS

FIG. 1 is a view illustrating a mounted state of a rider-assistance system according to an embodiment of the present invention to a straddle-type vehicle.

FIG. 2 is a diagram for illustrating a schematic configuration of the rider-assistance system according to the embodiment of the present invention.

FIG. 3 is a chart illustrating an example of a control flow by a controller in the rider-assistance system according to the embodiment of the present invention.

DETAILED DESCRIPTION

A description will hereinafter be made on a rider-assistance system according to the present invention with reference to the drawings.

A configuration, operation, and the like, which will be described below, merely constitute one example. The rider-assistance system according to the present invention is not limited to a case with such a configuration, such operation, and the like.

For example, a description will hereinafter be made on a case where the rider-assistance system according to the present invention is used for a two-wheeled motor vehicle. However, the rider-assistance system according to the present invention may be used for a straddle-type vehicle other than the two-wheeled motor vehicle. The straddle-type vehicle means a vehicle that a rider straddles. Examples of the straddle-type vehicle are motorcycles (the two-wheeled motor vehicle and a three-wheeled motor vehicle), an all-terrain vehicle, and a bicycle. Examples of the motorcycle are a motorbike, a scooter, and an electric scooter. The bicycle means a vehicle capable of traveling forward on a road by a depression force applied to pedals by the rider. The bicycles include a normal bicycle, an electrically-assisted bicycle, an electric bicycle, and the like.

The same or similar description will appropriately be simplified or will not be made below. In the drawings, the same or similar members or portions will be denoted by the same reference sign. In addition, a detailed structure will appropriately be illustrated in a simplified manner or will not be illustrated.

In addition, "acceleration/deceleration" in the present invention is a concept expressed such that acceleration has a positive value and deceleration has a negative value. That is, such expression that the "acceleration/deceleration is reduced" in the present invention means a state where the acceleration is reduced or a state where the deceleration is increased. Meanwhile, such expression that the "acceleration/deceleration is increased" in the present invention means a state where the acceleration is increased or a state where the deceleration is reduced.

Embodiment

A description will hereinafter be made on a rider-assistance system according to an embodiment.
<Configuration of Rider-Assistance System>
A description will be made on a configuration of the rider-assistance system according to the embodiment.

FIG. 1 is a view of a mounted state of the rider-assistance system according to the embodiment of the present invention to the straddle-type vehicle. FIG. 2 is a diagram for illustrating a schematic configuration of the rider-assistance system according to the embodiment of the present invention.

As illustrated in FIG. 1 and FIG. 2, a straddle-type vehicle 100 includes a trunk 1, a handlebar 2 that is held by the trunk 1 in a freely turnable manner, a front wheel 3 that is held by the trunk 1 in a freely turnable manner with the handlebar 2, a rear wheel 4 that is held by the trunk 1 in a freely rotatable manner, a brake system 10, a drive system 20, and a gearshift system 30. The straddle-type vehicle 100 also includes a rider-assistance system 50 that includes a controller 51.

The brake system 10 includes a front-wheel brake mechanism 11 for braking the front wheel 3 and a rear-wheel brake mechanism 12 for braking the rear wheel 4. When the rider operates an input section (for example, a brake lever 13) that corresponds to the front-wheel brake mechanism 11, with a force corresponding to an operation amount thereof, a brake pad (not illustrated) in the front-wheel brake mechanism 11 is pressed against a rotor (not illustrated) that rotates with the front wheel 3, and the front wheel 3 is thereby braked. Meanwhile, when the rider operates an input section (for example, a brake pedal 14) that corresponds to the rear-wheel brake mechanism 12, with a force corresponding to an operation amount thereof, a brake pad (not illustrated) in the rear-wheel brake mechanism 12 is pressed against a rotor (not illustrated) that rotates with the rear wheel 4, and the rear wheel 4 is thereby braked.

The controller 51 can separately control braking forces generated by the front-wheel brake mechanism 11 and the rear-wheel brake mechanism 12. For example, the controller 51 controls the brake pad in the front-wheel brake mechanism 11 to separate from the rotor, and can thereby reduce the braking force generated on the front wheel 3. Meanwhile, the controller 51 controls the brake pad in the front-wheel brake mechanism 11 to be brought close to the rotor, and can thereby increase the braking force generated on the front wheel 3. In addition, the controller 51 controls the brake pad in the rear-wheel brake mechanism 12 to separate from the rotor, and can thereby reduce the braking force generated on the rear wheel 4. Meanwhile, the controller 51 controls the brake pad in the rear-wheel brake mechanism 12 to be brought close to the rotor, and can thereby increase the braking force generated on the rear wheel 4. That is, the controller 51 can control acceleration/deceleration of the straddle-type vehicle 100 by controlling the braking forces generated on the front wheel 3 and the rear wheel 4. Furthermore, the controller 51 can control distribution of changes in the braking forces generated on the front wheel 3 and the rear wheel 4.

The drive system 20 transmits output of a drive source (for example, an engine, a motor, or the like) 21 to the gearshift system 30. When the rider operates an input section (for example, an accelerator grip 22), output corresponding to an operation amount thereof is changed by the gearshift system 30 and transmitted to a drive wheel (for example, the rear wheel 4).

The controller 51 can control the output of the drive source 21 in the drive system 20. For example, the controller 51 can increase/reduce the output of the drive source 21 by controlling an opening degree of a throttle (not illustrated). The controller 51 can also generate the braking force (so-called engine braking) on the drive wheel by controlling the throttle to be closed. That is, the controller 51 can control the acceleration/deceleration of the straddle-type vehicle 100 by controlling the output of the drive source 21. The controller 51 can also control the braking force that is generated on the drive wheel. When controlling the distribution of the changes in the braking forces generated on the front wheel 3 and the rear wheel 4, the controller 51 can control the drive system 20 instead of or in addition to the brake system 10.

The controller 51 can control a gear ratio of the gearshift system 30. For example, the controller 51 can increase the gear ratio by executing control to step down a selected stage of a multistage gearshift mechanism 31. Here, in the case where the gear ratio is increased in a state where the throttle is closed, the braking force (the so-called engine braking) that is generated on the drive wheel is increased. In addition, the controller 51 can reduce the gear ratio by executing control to step up the selected stage of the multistage gearshift mechanism 31. Here, in the case where the gear ratio is reduced in the state where the throttle is closed, the braking force (the so-called engine braking) that is generated on the drive wheel is reduced. That is, the controller 51 can control the acceleration/deceleration of the straddle-type vehicle 100 by controlling the gear ratio of the gearshift system 30. The controller 51 can also control the braking force that is generated on the drive wheel. When controlling the distribution of the changes in the braking forces generated on the front wheel 3 and the rear wheel 4, the controller 51 can control the gearshift system 30 instead of or in addition to the brake system 10.

The controller 51 includes a determination section 52 and a haptic motion performing section 53. The controller 51 may partially or entirely be constructed of a microcomputer, a microprocessor unit, or the like, may partially or entirely be constructed of a member in which firmware or the like can be updated, or may partially or entirely be a program module that is executed by a command from a CPU or the like, for example. The controller 51 may be provided as one unit or may be divided into multiple units, for example.

The determination section 52 determines necessity of a warning that is given to the rider of the straddle-type vehicle 100 during travel of the straddle-type vehicle 100. For example, the determination section 52 may determine the necessity of the warning on the basis of output of various sensors, each of which detects a state of the rider or each component of the straddle-type vehicle 100, may determine the necessity of the warning on the basis of output of a surrounding environment sensor that is mounted to the straddle-type vehicle 100, or may determine the necessity of the warning on the basis of information that is acquired via wireless communication with another vehicle or infrastructure equipment.

In the case where the determination section 52 determines that the warning is necessary, the haptic motion performing section 53 performs haptic motion at least once to reduce or increase the acceleration/deceleration of the straddle-type vehicle 100 only for a moment. The acceleration/deceleration after having been reduced or increased only for the moment may be equal to or may not be equal to the acceleration/deceleration prior to such reduction or increase. The haptic motion performing section 53 reduces or increases the acceleration/deceleration only for the moment by increasing or reducing the braking force on the wheel (the front wheel 3 or the rear wheel 4). An increased/reduced amount, a grade of the increase/reduction, and an interval of the increase/reduction are each set to a value with which the rider can perceive generation of the warning. The haptic motion may be performed in a state where the braking force is generated on each of the wheels, or may be performed in a state where the braking force is generated on none of the wheels.

Here, the haptic motion performing section 53 changes priorities of the front wheel 3 and the rear wheel 4 at the time of increasing/reducing the braking force according to a focusing direction that is a direction in which the rider should focus by the warning. That is, the haptic motion performing section 53 changes the priorities of the front wheel 3 and the rear wheel 4 at the time of increasing/reducing the braking force according to a type of the warning that is given to the rider.

The haptic motion may be motion that changes the braking force of only one of the front wheel 3 and the rear wheel 4, or may be motion that changes the braking forces of both of the front wheel 3 and the rear wheel 4. In the case where the haptic motion is the motion that changes the braking force of only one of the front wheel 3 and the rear wheel 4, the haptic motion performing section 53 selects one of the front wheel 3 and the rear wheel 4, the braking force of which is changed in the haptic motion, according to the focusing direction and thereby changes the priorities. Meanwhile, in the case where the haptic motion is the motion that changes the braking forces of both of the front wheel 3 and the rear wheel 4, the haptic motion performing section 53 changes allocation of the change in the braking force generated on the front wheel 3 and the change in the braking force generated on the rear wheel 4 in the haptic motion according to the focusing direction, and thereby changes the priorities.

In the case where the warning, the necessity of which is determined by the determination section 52, is a warning of an object or an event located in front of the straddle-type vehicle 100, the haptic motion performing section 53 sets the priority of the front wheel 3 to be higher than that of the rear wheel 4. That is, in the case where the haptic motion is the motion that changes the braking force of only one of the front wheel 3 and the rear wheel 4, and the determination section 52 determines that the warning of the object or the event located in front of the straddle-type vehicle 100 is necessary, the haptic motion performing section 53 performs the haptic motion to change the braking force of the front wheel 3 only. Meanwhile, in the case where the haptic motion is the motion that changes the braking forces of both of the front wheel 3 and the rear wheel 4, and the determination section 52 determines that the warning of the object or the event located in front of the straddle-type vehicle 100 is necessary, the haptic motion performing section 53 performs the haptic motion in which the change in the braking force generated on the front wheel 3 is larger than the change in the braking force generated on the rear wheel 4.

As an example, in the case where the warning, the necessity of which is determined by the determination section 52, is a warning of a frontal collision that possibly occurs to the straddle-type vehicle 100 (for example, presence of an obstacle, moving out of an oncoming vehicle from a lane, or the like), the haptic motion performing section 53 sets the priority of the front wheel 3 to be higher than that of the rear wheel 4. That is, when the determination section 52 determines that there is a high possibility of the occurrence of the frontal collision to the straddle-type vehicle 100, the haptic motion performing section 53 performs the haptic motion in which the priority of the front wheel 3 is higher than that of the rear wheel 4. The determination section 52 may determine the necessity of the warning of the frontal collision on the basis of output of a surrounding environment sensor that is mounted to the straddle-type vehicle 100, or may determine the necessity of the warning of the frontal collision on the basis of information that is acquired via wireless communication with another vehicle or infrastructure equipment. The haptic motion performing section 53 preferably performs the haptic motion to reduce the acceleration/deceleration of the straddle-type vehicle 100 only for the moment.

As an example, in the case where the warning, the necessity of which is determined by the determination section 52, is a warning of a traffic condition (for example, a traffic jam, an accident, or the like that occurs in an advancing direction of the straddle-type vehicle 100), the haptic motion performing section 53 sets the priority of the front wheel 3 to be higher than that of the rear wheel 4. That is, when the determination section 52 determines that the current traffic condition is a condition that the deceleration of the straddle-type vehicle 100 is possibly necessary, the haptic motion performing section 53 performs the haptic motion in which the priority of the front wheel 3 is higher than that of the rear wheel 4. The determination section 52 may determine the necessity of the warning of the traffic condition on the basis of the output of the surrounding environment sensor that is mounted to the straddle-type vehicle 100, or may determine the necessity of the warning of the traffic condition on the basis of the information that is acquired via the wireless communication with the other vehicle or the infrastructure equipment.

As an example, in the case where the warning, the necessity of which is determined by the determination section 52, is a warning of a traffic sign (for example, an upper limit speed, prohibition of entry, or the like), the haptic motion performing section 53 sets the priority of the front wheel 3 to be higher than that of the rear wheel 4. That is, when the determination section 52 determines presence of the traffic sign that has an impact on a driving operation of the straddle-type vehicle 100, the haptic motion performing section 53 performs the haptic motion in which the priority of the front wheel 3 is higher than that of the rear wheel 4. The determination section 52 may determine the necessity of the warning of the traffic sign on the basis of the output of the surrounding environment sensor that is mounted to the straddle-type vehicle 100, or may determine the necessity of the warning of the traffic sign on the basis of the information that is acquired via the wireless communication with the other vehicle or the infrastructure equipment.

In the case where the warning, the necessity of which is determined by the determination section 52, is a warning of an object or an event located behind the straddle-type vehicle 100, the haptic motion performing section 53 sets the priority of the rear wheel 4 to be higher than that of the front wheel 3. That is, in the case where the haptic motion is the motion that changes the braking force of only one of the front wheel 3 and the rear wheel 4, and the determination section 52 determines that the warning of the object or the event located behind the straddle-type vehicle 100 is necessary, the haptic motion performing section 53 performs the haptic motion to change the braking force of the rear wheel 4 only. Meanwhile, in the case where the haptic motion is the motion that changes the braking forces of both of the front wheel 3 and the rear wheel 4, and the determination section 52 determines that the warning of the object or the event located behind the straddle-type vehicle 100 is necessary, the haptic motion performing section 53 performs the haptic motion in which the change in the braking force generated on the rear wheel 4 is larger than the change in the braking force generated on the front wheel 3.

As an example, in the case where the warning, the necessity of which is determined by the determination section 52, is a warning of a rear collision that possibly occurs to the straddle-type vehicle 100 (for example, sudden approach of a following vehicle, tailgating by the following vehicle, or the like), the haptic motion performing section 53 sets the priority of the rear wheel 4 to be higher than that of the front wheel 3. That is, when the determination section 52 determines that there is a high possibility of the occurrence of the rear collision to the straddle-type vehicle 100, the haptic motion performing section 53 performs the haptic motion in which the priority of the rear wheel 4 is higher than that of the front wheel 3. The determination section 52 may determine the necessity of the warning of the rear collision on the basis of the output of the surrounding environment sensor that is mounted to the straddle-type vehicle 100, or may determine the necessity of the warning of the rear collision on the basis of the information that is acquired via the wireless communication with the other vehicle or the infrastructure equipment. The haptic motion performing section 53 preferably performs the haptic motion to increase the acceleration/deceleration of the straddle-type vehicle 100 only for the moment.

As an example, in the case where the warning, the necessity of which is determined by the determination section 52, is a warning of travel of another vehicle that is located obliquely behind the straddle-type vehicle 100 (for example, parallel travel of a vehicle that travels in an adjacent lane, passing by the vehicle, or the like), the haptic motion performing section 53 sets the priority of the rear wheel 4 to be higher than that of the front wheel 3. That is, when the determination section 52 determines that the other vehicle travels obliquely behind, the haptic motion performing section 53 performs the haptic motion in which the priority of the rear wheel 4 is higher than that of the front wheel 3. The determination section 52 may determine the necessity of the warning of the other vehicle located obliquely behind on the basis of the output of the surrounding environment sensor that is mounted to the straddle-type vehicle 100, or may determine the necessity of the warning of the other vehicle located obliquely behind on the basis of the information that is acquired via the wireless communication with the other vehicle or the infrastructure equipment.

In the case where the warning, the necessity of which is determined by the determination section 52, is a warning that urges the rider to perform an operation, the haptic motion performing section 53 sets the priority of the front wheel 3 to be higher than that of the rear wheel 4. That is, in the case where the haptic motion is the motion that changes the braking force of only one of the front wheel 3 and the rear wheel 4, and the determination section 52 determines that the warning is necessary to urge the rider to perform the operation, the haptic motion performing section 53 performs the haptic motion to change the braking force of the front wheel 3 only. Meanwhile, in the case where the haptic motion is the motion that changes the braking forces of both of the front wheel 3 and the rear wheel 4, and the determination section 52 determines that the warning is necessary to urge the rider to perform the operation, the haptic motion performing section 53 performs the haptic motion in which the change in the braking force generated on the front wheel 3 is larger than the change in the braking force generated on the rear wheel 4.

As an example, in the case where the warning, the necessity of which is determined by the determination section 52, is a warning that urges the rider to perform a driving operation (for example, acceleration/deceleration, turning, or the like) of the straddle-type vehicle 100, the haptic motion performing section 53 sets the priority of the front wheel 3 to be higher than that of the rear wheel 4. That is, when the determination section 52 determines that it is necessary to urge the rider to perform the driving operation, the haptic motion performing section 53 performs the haptic motion in which the priority of the front wheel 3 is higher than that of the rear wheel 4. For example, the determination section 52 may determine the necessity of the warning that urges the driving operation on the basis of output of various sensors, each of which detects a state of the rider or each component of the straddle-type vehicle 100, may determine the necessity of the warning that urges the driving operation on the basis of the output of the surrounding environment sensor that is mounted to the straddle-type vehicle 100, or may determine the necessity of the warning that urges the driving operation on the basis of the information that is acquired via the wireless communication with the other vehicle or the infrastructure equipment.

As an example, in the case where the warning, the necessity of which is determined by the determination section 52, is a warning that urges the rider to perform a setting operation (for example, ON/OFF of the device or a function, switching of a mode, a parameter change, or the like) of the straddle-type vehicle 100, the haptic motion performing section 53 sets the priority of the front wheel 3 to be higher than that of the rear wheel 4. That is, when the determination section 52 determines that it is necessary to urge the rider to perform the setting operation, the haptic motion performing section 53 performs the haptic motion in which the priority of the front wheel 3 is higher than that of the rear wheel 4. For example, the determination section 52 may determine the necessity of the warning that urges the setting operation on the basis of the output of the various sensors, each of which detects the state of the rider or each of the components of the straddle-type vehicle 100, may determine the necessity of the warning that urges the setting operation on the basis of the output of the surrounding environment sensor that is mounted to the straddle-type vehicle 100, or may determine the necessity of the warning that urges the setting operation on the basis of the information that is acquired via the wireless communication with the other vehicle or the infrastructure equipment.

<Operation of Rider-Assistance System>

A description will be made on operation of the rider-assistance system according to the embodiment.

FIG. 3 is a chart illustrating an example of a control flow by the controller in the rider-assistance system according to the embodiment of the present invention.

The controller 51 repeatedly executes the control flow illustrated in FIG. 3 while the rider-assistance operation is valid and the straddle-type vehicle 100 travels.

(Determination Step)

In step S101, the determination section 52 in the controller 51 determines the necessity of the warning that is given to the rider of the straddle-type vehicle 100. If the determination section 52 determines that the warning is necessary, the processing proceeds to step S102. If not, the processing returns to step S101.

(Haptic Motion Performing Step)

In step S102, the haptic motion performing section 53 in the controller 51 performs the haptic motion at least once to reduce or increase the acceleration/deceleration of the straddle-type vehicle 100 only for the moment. The haptic motion performing section 53 reduces or increases the acceleration/deceleration only for the moment by increasing or reducing the braking force on the wheel (the front wheel 3 or the rear wheel 4). Here, the haptic motion performing section 53 changes the priorities of the front wheel 3 and the rear wheel 4 at the time of increasing/reducing the braking force according to the focusing direction that is the direction in which the rider should focus by the warning.

<Effects of Rider-Assistance System>

A description will be made on effects of the rider-assistance system according to the embodiment.

In the rider-assistance system 50, the controller 51 includes: the determination section 52 that determines the necessity of the warning given to the rider of the straddle-type vehicle 100; and the haptic motion performing section 53 that performs the haptic motion at least once to reduce or increase the acceleration/deceleration of the straddle-type vehicle 100 only for the moment in the case where the determination section 52 determines that the warning is necessary. The haptic motion performing section 53 changes the priority of each of the wheels (the front wheel 3 or the rear wheel 4) at the time of changing the braking force to reduce or increase the acceleration/deceleration only for the moment in the haptic motion according to the focusing direction that is the direction in which the rider should focus by the warning. With such control, the rider who has perceived the haptic motion can roughly recognize the direction in which an object or an event to be focused is located from a difference in performance of the haptic motion. Therefore, it is possible to hasten identification of the object or the event to be focused by the rider. In particular, in the straddle-type vehicle 100, due to a riding posture of the rider, the difference in the performance of the haptic motion, which is caused by the change in the priority, can further be recognized easily. Therefore, it is possible to reliably hasten the identification of the object or the event to be focused by the rider.

Preferably, in the case where the warning is the warning of the object or the event located in front of the traveling straddle-type vehicle 100, in the haptic motion, the haptic motion performing section 53 sets the priority of the front wheel 3 to be higher than that of the rear wheel 4. With such control, the rider who has perceived the haptic motion can recognize that the object or the event to be focused is located in front. Thus, it is possible to hasten the identification of the object or the event to be focused by the rider.

Preferably, in the case where the warning is the warning of the object or the event located behind the traveling straddle-type vehicle 100, in the haptic motion, the haptic motion performing section 53 sets the priority of the rear wheel 4 to be higher than that of the front wheel 3. With such control, the rider who has perceived the haptic motion can recognize that the object or the event to be focused is located behind. Thus, it is possible to hasten the identification of the object or the event to be focused by the rider.

Preferably, in the case where the warning is the warning that urges the rider to perform the operation, in the haptic motion, the haptic motion performing section 53 sets the priority of the front wheel 3 to be higher than that of the rear wheel 4. With such control, the rider who has perceived the haptic motion performs the operation after focusing on the object or the event located in front at an early point. Thus, safety is improved.

The description has been made so far on the embodiment. However, the present invention is not limited to the description of the embodiment. For example, the embodiment may only partially be implemented. Furthermore, for example, another step may be added to the control flow illustrated in FIG. 3.

REFERENCE SIGNS LIST

1: Trunk
2: Handlebar
3: Front wheel
4: Rear wheel
10: Brake system
11: Front-wheel brake mechanism
12: Rear-wheel brake mechanism
13: Brake lever
14: Brake pedal
20: Drive system
21: Drive source
22: Accelerator grip
30: Gearshift system
31: Multistage gearshift mechanism
50: Rider-assistance system
51: Controller
52: Determination section
53: Haptic motion performing section
100: Straddle-type vehicle

The invention claimed is:

1. A controller (51) for a rider-assistance system (50) that is mounted to a straddle-type vehicle (100) including a front wheel (3) and a rear wheel (4), the controller comprising:
a determination section (52) that determines necessity of a warning that is given to a rider of the straddle-type vehicle (100) during travel of said straddle-type vehicle (100); and
a haptic motion performing section (53) that performs a haptic motion of the straddle-type vehicle (100) by reducing or increasing an acceleration/deceleration of the straddle-type vehicle (100) only for a moment according to a priority in the case where the determination section (52) determines that the warning is necessary, wherein
the haptic motion performing section (53) sets the priority of the front wheel (3) and the rear wheel (4) at the time of changing a braking force to reduce or increase the acceleration/deceleration only for the moment in the haptic motion, and
the priority of each of the front wheel (3) and the rear wheel (4) is set according to a focusing direction that is a direction in which the rider should focus by the warning.

2. The controller according to claim 1, wherein
the haptic motion is motion that changes the braking force of only one of the front wheel (3) and the rear wheel (4), and
the haptic motion performing section (53) selects one of the front wheel (3) and the rear wheel (4), the braking force of which is to be changed in the haptic motion, according to the focusing direction and thereby changes the priority.

3. The controller according to claim 1, wherein
the haptic motion is motion that changes the braking forces of both of the front wheel (3) and the rear wheel (4), and
the haptic motion performing section (53) changes allocation of a change in the braking force generated on the front wheel (3) and a change in the braking force generated on the rear wheel (4) in the haptic motion according to the focusing direction, and thereby changes the priority.

4. The controller according to claim 1, wherein
in the case where the warning is a warning of an object or an event located in front of the traveling straddle-type vehicle (100), in the haptic motion, the haptic motion performing section (53) sets the priority of the front wheel (3) to be higher than that of the rear wheel (4).

5. The controller according to claim 4, wherein
the object or the event located in front is a frontal collision that possibly occurs to the straddle-type vehicle (100).

6. The controller according to claim 4, wherein
the object or the event located in front is a traffic condition.

7. The controller according to claim 4, wherein
the object or the event located in front is a traffic sign.

8. The controller according to claim 1, wherein
in the case where the warning is a warning of an object or an event located behind the traveling straddle-type vehicle (100), in the haptic motion, the haptic motion performing section (53) sets the priority of the rear wheel (4) to be higher than that of the front wheel (3).

9. The controller according to claim 8, wherein
the object or the event located behind is a rear collision that possibly occurs to the straddle-type vehicle (100).

10. The controller according to claim 8, wherein
the object or the event located behind is travel of another vehicle that is located obliquely behind the straddle-type vehicle (100).

11. The controller according to claim 1, wherein
in the case where the warning is a warning that urges the rider to perform an operation, in the haptic motion, the haptic motion performing section (53) sets the priority of the front wheel (3) to be higher than that of the rear wheel (4).

12. The controller according to claim 11, wherein
the operation is a driving operation of the straddle-type vehicle (100).

13. The controller according to claim 11, wherein
the operation is a setting operation of the straddle-type vehicle (100).

14. The controller according to claim 1, wherein
in the haptic motion, the haptic motion performing section (53) controls at least one of a brake system (10), a drive system (20), and a gearshift system (30) of the straddle-type vehicle (100) so as to change the braking force.

15. A control method for a rider-assistance system (50) that is mounted to a straddle-type vehicle (100) including a front wheel (3) and a rear wheel (4), the control method comprising:
   a determination step (S101) in which a determination section (52) of a controller (51) determines necessity of a warning that is given to a rider of the straddle-type vehicle (100) during travel of said straddle-type vehicle (100); and
   a haptic motion performing step (S102) in which a haptic motion performing section (53) of the controller (51) performs a haptic motion of the straddle-type vehicle (100) by reducing or increasing an acceleration/deceleration of the straddle-type vehicle (100) only for a moment according to a priority in the case where it is determined in the determination step (S101) that the warning is necessary, wherein
   in the haptic motion performing step (S102), the haptic motion performing section (53) sets the priority of the front wheel (3) and the rear wheel (4) at the time of changing a braking force to reduce or increase the acceleration/deceleration only for the moment in the haptic motion, and
   the priority of each of the front wheel (3) and the rear wheel (4) is set according to a focusing direction that is a direction in which the rider should focus by the warning.

16. The controller according to claim 1, wherein the haptic motion performing section (53) sets the priority such that the braking force is distributed on the front wheel (3) and the rear wheel (4) according to the focusing direction.

17. The controller according to claim 16, wherein the braking force is distributed such that a braking force generated on one of the front wheel (3) and the rear wheel (4) is greater than a braking force generated on the other of the front wheel (3) and the rear wheel (4) according to the focusing direction.

18. The control method of claim 15, further comprising:
   in the haptic motion performing step (S102), the haptic motion performing section (53) sets the priority such that the braking force is distributed on the front wheel (3) and the rear wheel (4) according to the focusing direction.

19. The control method of claim 18, wherein the braking force is distributed such that a braking force generated on one of the front wheel (3) and the rear wheel (4) is greater than a braking force generated on the other of the front wheel (3) and the rear wheel (4) according to the focusing direction.

20. The controller according to claim 1, wherein the priority set for each of the front wheel (3) and the rear wheel (4) differs for different focusing directions.

* * * * *